Nov. 12, 1935.  R. V. GRAYSON ET AL  2,020,639
THERMAL INSULATION UNIT OR BOARD
Filed July 25, 1932  4 Sheets-Sheet 1
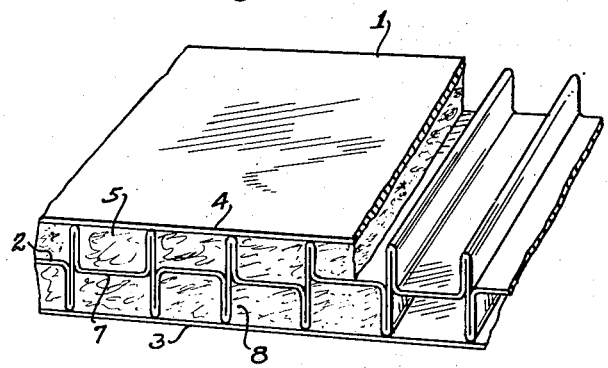
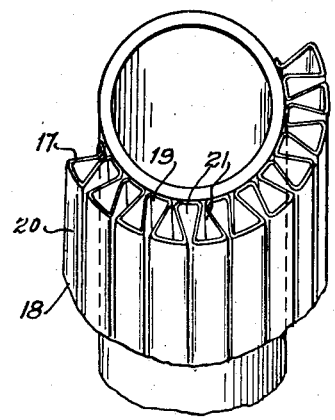
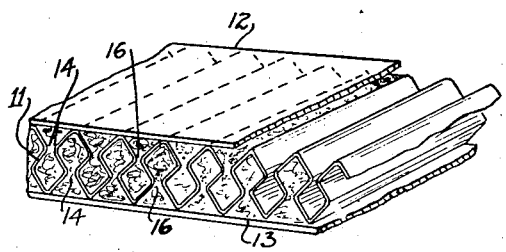
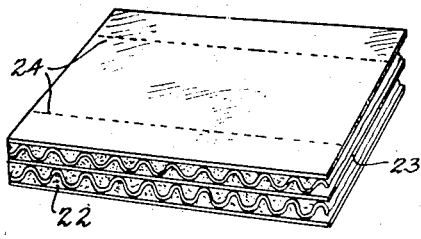
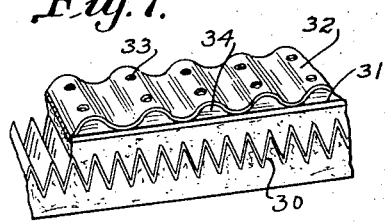
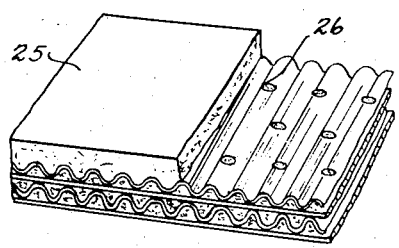
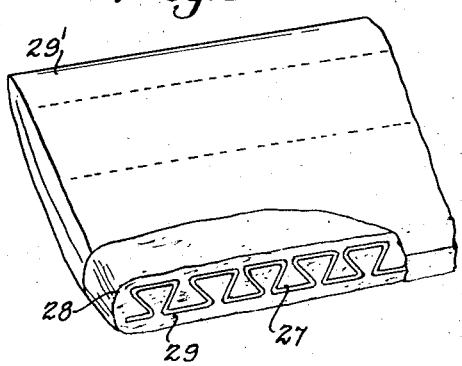
Inventors
RALPH V. GRAYSON
AND EDGAR G. BALLENGER
By Mason Fenwick & Lawrence
Attorneys

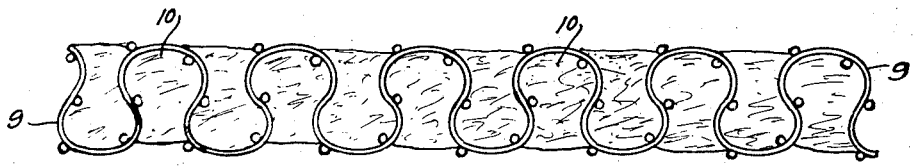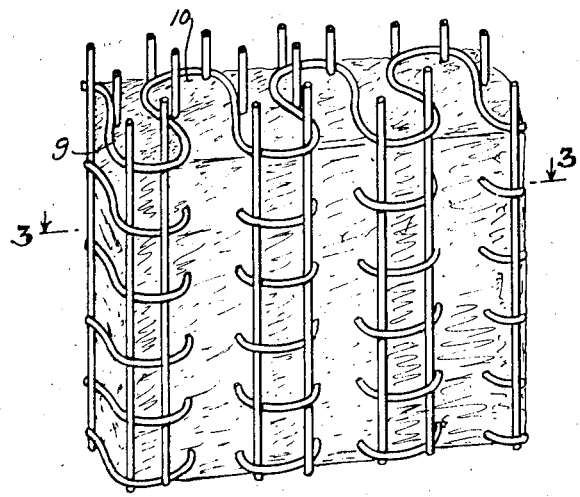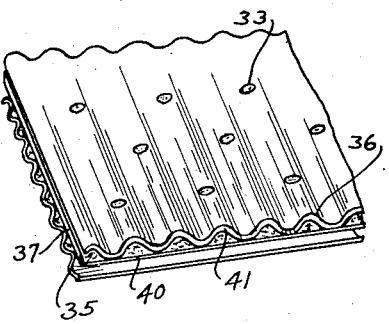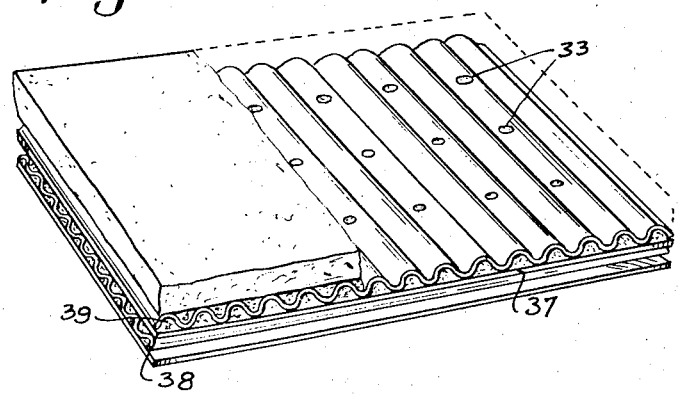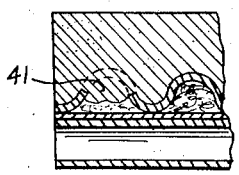

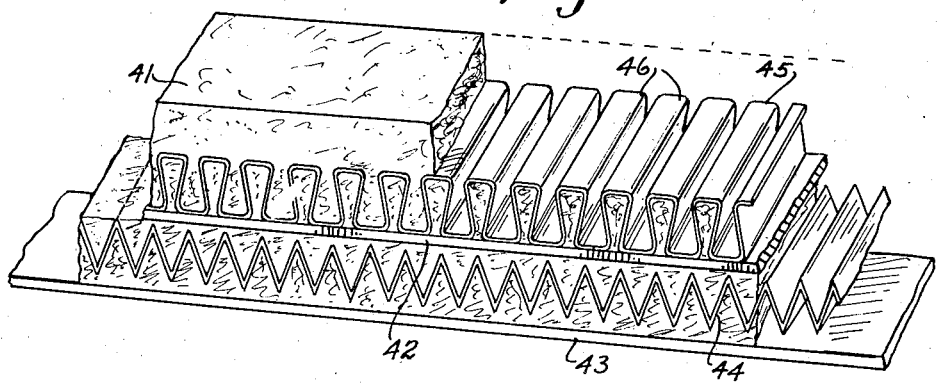
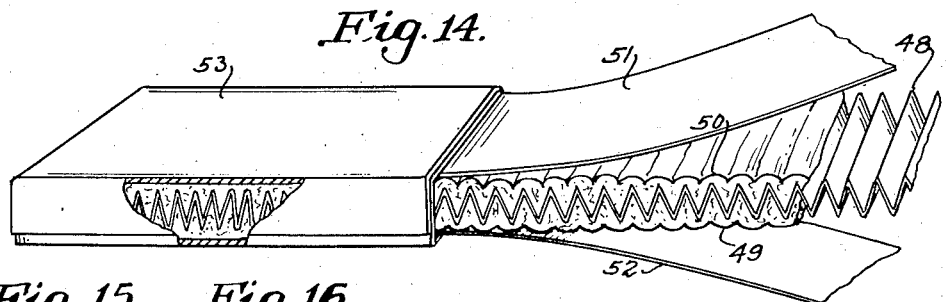
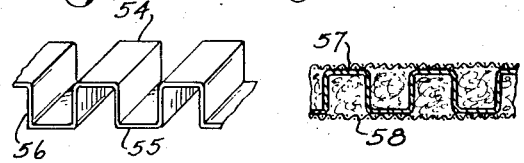 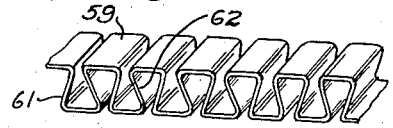
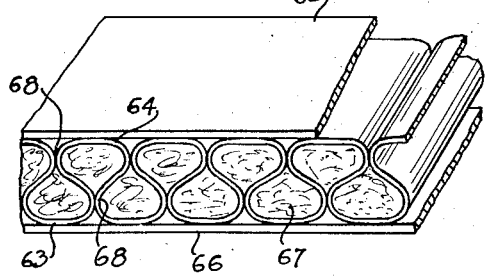 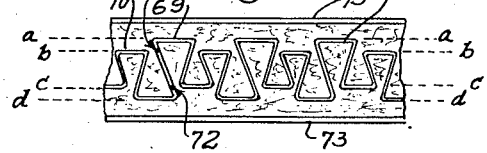

Nov. 12, 1935.   R. V. GRAYSON ET AL   2,020,639
THERMAL INSULATION UNIT OR BOARD
Filed July 25, 1932    4 Sheets-Sheet 4

Inventors
RALPH V. GRAYSON
AND EDGAR G. BALLENGER
By Mason Fenwick Lawrence
Attorneys Patented Nov. 12, 1935

2,020,639

UNITED STATES PATENT OFFICE 2,020,639

THERMAL INSULATION UNIT OR BOARD

Ralph V. Grayson and Edgar G. Ballenger, Atlanta, Ga.

Application July 25, 1932, Serial No. 624,595

8 Claims. (Cl. 154—44)

This invention relates to fabricated thermal insulating material such as may be manufactured in sheets or units of suitable or convenient size, and employed in the walls of buildings, cold storage rooms or ware houses, as the linings of refrigerators or freight cars, or in connection with roofs or floors, or in the construction of shipping receptacles, or in any other relation in which the object to be achieved is the inhibition of heat interchange.

The present invention has for its broad object the construction of an insulation board or unit having a skeleton structure of relatively stiff material constituting, by itself or in coordination with the outer wall or walls of said board or unit, a system of cells, the latter being filled with fibrous insulation substance, such, for instance, as cotton linters, or in the event that the insulation must be absolutely fire-proof, being filled with mineral wool.

Another object of the invention is the provision of an insulation sheet or unit in which the skeleton or framework is so constructed as to permit the sheet or unit to yield widthwise under pressure so as to enable its thickness to be slightly decreased if desired, and at the same time resisting compression beyond the said slight limit of yield, so as to prevent its being crushed or permanently flattened.

Still another object of the invention is the provision of the insulation sheet with one surface thereof formed with dove-tailed channels, apertures, or the like, forming a key-way for interlocking with a superficial coating or layer of plaster or its equivalent.

Other objects of the invention will appear as the following description of a number of modifications thereof proceed.

In the drawings which accompany and form a part of the following specification and throughout the several figures of which, the same characters of reference have been employed to designate identical parts:

Figure 1 is a perspective view of one form of insulation unit;

Figure 2 is a perspective view of another form of insulation unit, of 100% fire-proof characteristic;

Figure 3 is a transverse section taken along the line 3—3 of Figure 2;

Figures 4, 5 and 6 are perspective views of other forms of the invention;

Figures 7 and 8 are perspective views of other modifications in which the top layer is provided with means forming key-ways for a plaster coating;

Figure 9 is a perspective view of a form of the invention in which the skeletal element is covered with soft layers of the insulating fiber, the unit being in the form of a yielding padding;

Figures 10 and 11 are perspective views of still additional forms adapted for the application of a plaster super-coat;

Figure 12 is a detail view in section of that form of the invention shown in Figure 11;

Figure 13 is a perspective view of still another form of the invention, parts being broken away;

Figure 14 is a perspective view of a further modification, the several elements being shown in separated relation in order to illustrate the construction;

Figure 15 is a perspective view showing another form of framework or skeletal;

Figure 16 is a vertical section through an insulation board in which the framework shown in Figure 15 is employed;

Figure 17 is a perspective view of a modified form of the invention in which adjacent portions of the framework come together under compression of the sheet so as to prevent its being crushed;

Figure 18 is a perspective view of still another form of the invention in which the elements of the framework or skeletal contact in two intermediate planes parallel to the surfaces of the sheet;

Figure 19 represents diagrammatically an arrangement of the framework in which plateaus of resistance are formed in four intermediate planes;

Figure 20:
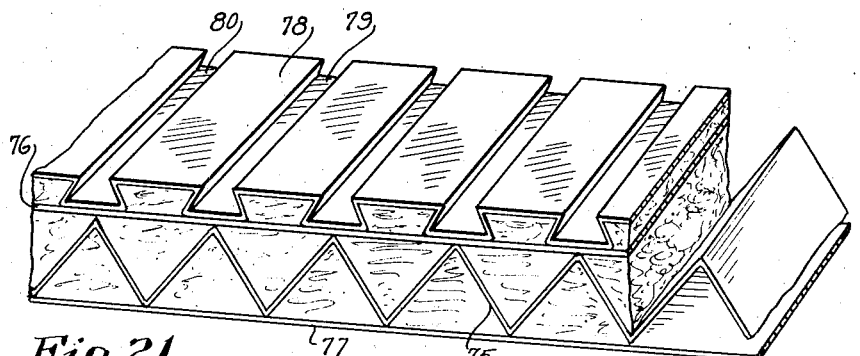
Figure 20 is a modified form of invention in which the insulation unit is provided with a paper lath construction.

Referring now in detail to the several figures and first adverting to that form of the invention shown in Figure 1, the numeral 1 represents in general an insulation unit comprising a relatively rigid framework or skeleton 2 supporting in spaced relation the upper and lower walls 3 and 4 of the insulating board or unit and with it defining cells 5 which are filled with fibrous material which may be of vegetable origin, such, for instance, as cotton linters, or if absolute fireproofness is desired, the filling may be of mineral wool.

The sheet 2 may be folded as shown, at right angles in order to form an intermediate septum 7 or partition lying parallel to the upper and lower walls, and forming vertical struts, the latter being of double thickness by virtue of the fact that the sheet which forms the septum is folded closely upon itself in the formation of the struts. This construction assures that the struts are of extraordinary stiffness and capable of resisting considerable endwise pressure. In the use of this insulating board or unit, it is sometimes desired to introduce it snugly between the double walls of a casing or chamber to be insulated. In order to make the introduction of the sheet easy under such conditions, it is possible to press laterally as well as downwardly upon the sheet, canting the vertical partitions to the positions indicated at 8 in broken lines. This reduces the thickness dimension of the board enabling its easy introduction into the space which it is to fit.

It will be understood that the struts in their canted position, have compressed the fiber in the adjoining cells both above and below the septum and when the board or unit has been finally positioned, it may be relieved of the pressure, whereupon the elasticity of the filling will raise the struts again substantially to their perpendicular position, and expand the board or unit in the direction of its thickness, causing it to fit snugly in its allotted space.

It is to be understood that the skeleton or framework 2 may in general be made of a suitable grade of paper or cardboard, in the interest of economy, but that if a strictly fire-proof construction is essential, it may be of metal, although the efficiency of the insulation board will not be so great in view of the conductive properties of the metal.

Figure 2 represents a form of the invention which may be used with or without the upper and lower surface sheets. It is shown as comprising a metallic skeleton or framework 9 formed of mesh screen bent into reversely arranged corrugations forming troughs 10 relatively wide and rotund at their base and narrowing toward their open sides. These troughs are filled with the vegetable or mineral insulation fiber. This construction has the advantage that it may be used in straight planar lengths or may be bent around curves such as pipes or cylindrical tanks. In bending it, the wires of the mesh screen, which constitute the narrow portions of the trough, approach one another closely on one side and recede correspondingly on the other side to compensate for the curvature of the object about which the insulation board may be bent.

Figure 4 illustrates a form of the invention in which the skeleton or framework 11 is composed of a sheet which is folded so as to extend back and forth between surface sheets 12 and 13. The said sheet which constitutes said framework is folded intermediately in oblique directions so as to form dihedral angles 14 extending the width of the board or unit and the dihedral angles of adjacent folds being oppositely disposed so as to define a plurality of laterally extending cells 15 of substantially diamond-shaped cross section, open at one side as indicated at 16. Downward pressure upon this insulation board tends to flatten the diamond-shaped cells, bringing the apices of adjacent dihedral angles into proximity until they touch. Just as soon as said apices come into contact, the insulation unit is supported and sustained against further flattening by series of contacting portions of the skeleton, lying in a plurality of planes parallel to the upper and lower surfaces of the sheet. The cells in this form of the invention, like those already described, are filled with cotton linters or other suitable vegetable or mineral heat insulating fibrous material.

This form of insulation board or unit is particularly adapted to yield within certain narrow limits so as to enable it to be inserted with facility into spaces narrower than its ordinary thickness, and to fit said spaces tightly when it is relieved of the pressure employed for its insertion. When the limit of compression is reached, it then positively resists further flattening or crushing, by the co-engagement of the several series of dihedral angles in the manner set forth.

Figure 8 represents an insulation board or unit in which the framework 17 is folded to form oppositely disposed dove-tails 18 and 19, the flat end surfaces 20 of which lie in close adjacency and themselves may form the top and bottom walls of the insulation unit or may be pasted or otherwise caused to adhere to upper and lower flat sheets, such as are indicated at 3 and 4 in Figure 1.

The channels 21 formed within the dove-tails are filled with the fibrous insulating material. An insulation board or unit thus formed, with its inner and outer surfaces unrestricted as to expansive or contractive capacity may be employed either flat or conformed to curved surfaces such as pipes.

Figures 5 and 6 show forms of insulation board in which the skeleton or framework 22 is of ordinary undulating section, the apices of the ridges being pasted or otherwise adhered to bounding sheets. In Figure 5, two layers of the corrugated framework are superposed with an intermediate flat sheet 23 between them. In lieu of pasting, the several elements of this board may be united by rows of stitching 24, the stitching being of fibrous thread or of wire, according to the use to which its insulation is to be put. The tubular cells formed by the corrugated framework are filled with insulating fiber prior to the stitching.

Figure 6 shows a modification which is similar to Figure 5 in that superposed layers of corrugated board are employed, but in place of an upper flat sheet, a plaster layer 25 is applied direct to one of the corrugated framework members. For the purpose of giving the plaster a firm key to the corrugated member, the latter is preferably formed with perforations 26 through which the plaster extends. In this, as in all other forms of insulation board herein described, the cells in the corrugated board are filled with fiber.

Figure 9 shows a further modification of the invention in which the framework or skeleton is constituted by a single corrugated septum 27 having flat corrugations 29. The valleys between the corrugations are filled with the insulating fiber, and a mass 28 of insulating fiber covers the upper and lower surfaces of the corrugated septum, forming it into a soft resilient pad. This pad may be covered with suitable flexible material 29' such as canvas or paper, and may be used for a heat insulating padding under carpets or rugs or in attics or in other places where a flexible heat insulating sheet is desired.

In Figure 7 a form of insulation board is shown which in some respects is quite similar to that form shown in Figure 9, inasmuch as it consists of a single corrugated framework member 30, the valleys of which are filled with heat insulated fiber, and a layer of said fiber covering the upper and inverted peaks of said framework. A stiff sheet 31 is stitched or otherwise caused to adhere to the padded framework 30 and a plaster base 32 in the form of corrugated sheet is fixed to the top surface of the sheet 31. The peaks of this corrugated sheet are formed with perforations 33 functioning as a key for the plaster. The cells 34 formed by the corrugations of the sheet 32 may be left vacant so as to serve as a run-way for the plaster which flows through the said perforations.

Figures 10 and 11 show a construction in which two sheets of corrugated board 35 and 36 are arranged with the corrugations arranged crosswise. As in a form of the invention already described, an intermediate sheet 37 extends between the corrugated layers, defining with said layers, inner series of cells 38 and 39.

In Figure 10, an upper flat sheet 40 is provided to which a corrugated plaster base 41 is secured, the plaster being perforated in a manner similar to that already described in connection with Figures 6 and 7.

In Figure 11 the top flat sheet is omitted and the upper corrugated layer itself forms the plaster base. That form of the invention shown in Figure 11 is provided with insulation fiber filling the cells of the corrugations. Figure 12 shows how the plaster enters the perforations 33 and forms a key 41, notwithstanding the presence of the fibrous filling of the cells.

Figure 13 shows a composite insulation board or unit, the main body portion of which comprises upper and lower insulation sheets 42 and 43, between which is arranged a corrugated spacing member 44, the folds of which are sharp forming a series of serrations. The cells of the serrations are filled with insulation fiber. Upon the top insulation sheet 44 is arranged a corrugated member 45 folded so as to form a series of dove-tails 46. Said dove-tails are also filled with the insulation fiber. The valleys formed between said dove-tails and which are wider at the bottom than at the top afford keys for a plaster coat 47. Due to the slight compressibility of the dove-tails and the yielding material which they contain, any stresses set up in the plaster on setting or through subsequent vibration, are accommodated by the yielding capacity of the dove-tails so that the plaster will not crack. The sheets 42 and 43 together with the corrugated members 44 and 45 may be secured together in any suitable manner, such, for instance, as by stitching, the rows of stitching preferably extending longitudinally certain of the valleys between the dove-tails 46 and at the bottom thereof.

In Figure 14 a form of insulation board is illustrated in which an accordion folded septum 48 is crimped together with insulation fiber sheets 49 and 50. The core thus formed is covered on the top and bottom with a layer of insulation 51 and 52 and the whole wrapped in a sheet 53 of paper or other suitable material.

Figures 15, 16 and 17 show various core shapes adapted to be employed in insulation units of the generic type disclosed in this invention, and in which the cells are adapted to be stuffed with vegetable or mineral insulation fiber. That form of core shown in Figure 15, includes right angular folds presenting flat surfaces 54 and 55 for adherence to the outside sheets 57 and 58, which are shown in Figure 16, and vertical struts 56 which, of course, resist compression to the maximum degree. Figure 1 in flat relation, shows the same core as has been illustrated in connection with Figure 5.

It is obvious that when the core is put under compression as for the purpose of slightly reducing its thickness in order to insert it into a cavity slightly thinner than itself, the dove-tails 59 and 60 will bulge sidewise until their corners contact. After that limit has been reached, the core forms a perfect girder, of which the portions 61 and 62 of the dove-tails form diagonal struts. It is understood that when a core of this shape or type is placed between upper and lower sheet members, the means of attachment should allow sufficient play to permit freedom of action of the dove-tails in the manner described.

Figure 18 discloses a modified form of the invention in which the core is composed of triangular dove-tails or folds 63 and 64, retained between the upper and lower sheets 65 and 66. The cells formed by the said dove-tails are filled with insulation fiber 67. By virtue of the rotundity of the walls of the cells or dove-tails, the core is extremely resilient and is capable of some compression. However, since the sides of adjacent cells contact as at 68, the amount of compression will be limited. It will be understood that the lines of contact between the adjacent cells lie in planes parallel to the upper and lower members 65 and 66 and on either side of the neutral plane which is neither under compression nor tension, when the board or unit is bent. In this manner the maximum of resiliency is secured, while, at the same time, the extent to which the board may be compressed thicknesswise is positively limited.

Figure 19 illustrates diagrammatically, a form of core consisting of dove-tails which alternate in height, a tall dove-tail 69 being arranged between a pair of short dove-tails 70. With this core as a framework, any desired type of insulation board may be built up. In compressing the thickness of this board, the dove-tails are deflected longitudinally until the corners of adjacent short dove-tails impinge against the side of the intervening tall dove-tail at points 71 and 72. When deflection to this extent has taken place, further deflection is inhibited by the positive contacts of adjacent dove-tails, the lines of contact being in planes indicated at B and C and which are parallel to the upper and lower surfaces of the board or unit.

This form of the invention is extremely important since the upper and lower sheets indicated at 73 and 74 may be tightly adhered as by pasting to the flat surfaces of the tall dove-tails, and yet the same flexibility and compressibility being realized as in other forms of the invention in which it is necessary to provide play between the outer sheets and the core.

Figure 20 shows a form of insulation unit in which an accordion folded inter-member 75 is employed, the apices of the reversed dihedral angles being united by stitching or otherwise to the top and bottom bounding sheets 76 and 77. The valleys between the ridges of this inter-member are filled with the insulation fiber.

A plaster base is secured to the top wall of this unit comprising a sheet folded to form flat under-cut laths 78 alternating with the valleys 79, forming a keyway to the plaster. The valleys have flat bottom faces 80 which are adhesively united to the top wall of the insuation unit. The spaces within the laths 78 are filled with the insulation fiber.

Figure 21:
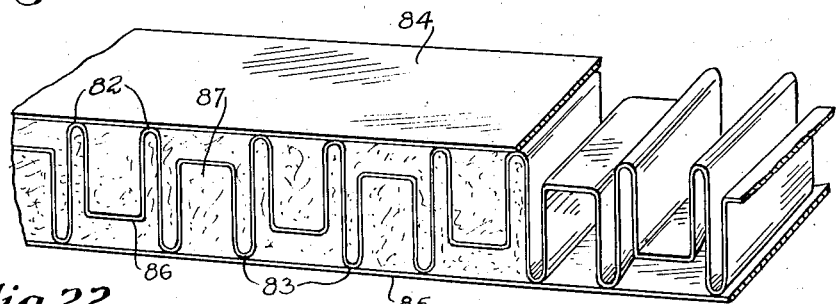
Figures 21 and 22 show in perspective, further modifications of the invention.

Figure 21 shows a form of the invention in which the inter-member is folded so as to provide S-shaped loops 81 contacting at their upper and lower ends 82 and 83 with the upper walls 84 and 85 to which they are united in any suitable manner. The S-shaped loops alternate with reversely arranged flat loops 86 and 87 of less altitude, the flat ends of which loops form longitudinal support for the insulation fiber which is filled into the voids between the upper and lower walls.

Figure 22:
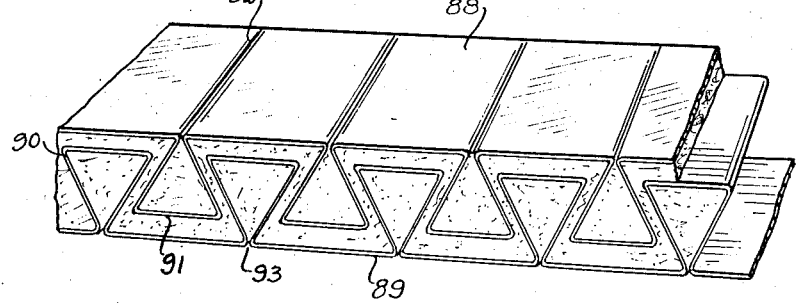

Figure 22 shows a form of insulation unit which may be employed straight or bent around gradual curves in either direction. In this instance, the upper and lower walls 88 and 89, respectively, are folded so as to form inwardly projecting hollow triangular ribs 90 and 91, which ribs form the inter-structure and are filled inside and out with the insulation fiber. The open apices of the triangular ribs come substantially together in the planes of the upper and lower walls as indicated at 92 and 93, and are capable of opening more or less according to the curvature about which the insulation unit is bent.

It will be understood that one of the main purposes of the various forms of inter-structure described and illustrated is to maintain uniform density of the insulating fibers throughout the extent of the insulation unit. This is accomplished by the insulation fibers being substantially divided into relatively small and similarly shaped boxes by the inter-structure, so that normally when there is no stress upon the inter-structure the density of the insulation fibers is uniform, while, when the inter-structure is displaced through compressive stress, the displacement of each repetend of the inter-structure is the same and consequently, it has the same compressive effect upon the insulating fibers which it engages so that uniformity of density of the insulation fibers is at all times perpetuated.

It is apparent from the above disclosure of a number of adaptations of my invention, that the broad generic principle relates to the filling of the cells formed by the corrugations, regardless of their shape and arrangement, with insulation material in fibrous form, and that the invention concerns itself also with the fabrication of an insulation board or unit which is capable of limited compression so that it may be inserted snugly into spaces having slightly less thickness than itself, so as to fit those spaces tightly when inserting pressure has been released, and that the invention also contemplates a definite limit of compression afforded by the core or framework, beyond which the insulation unit is incompressible under any stresses short of those that would utterly destroy it, and that the invention includes, not only those forms herein illustrated, but all other variations and arrangements in which the broad principle of the invention as herein enunciated, may be exemplified.

What we claim is:

1. Thermal insulation board including a skeletal core member having transverse corrugations in the form of reversely arranged dovetails with their end faces parallel to the surface planes of the board, alternate dovetails being shorter than the intervening dovetails on the same side, the corners of the shorter dovetails being closely adjacent to but normally out of contact with the sides of the adjacent taller dovetails, whereby when the insulation board is subjected to pressure in the direction of its thickness, said dovetails will be canted until the corners of the shorter dovetails impinge the sides of the adjacent taller dovetails.

2. Bendable thermal insulation board comprising upper and lower walls folded so as to provide adjacent flat portions in one plane, and intervening triangular ribs extending inwardly of said insulation unit, the triangular ribs of the upper and lower walls interdigitating in spaced relation, the apices of said triangular ribs opening in the planes of the flat portions, and the spaces within said insulation unit both inside and out of said triangular ribs being filled with insulation fiber.

3. Thermal insulation board including a skeletal core member folded so as to produce transversely extending corrugations, the walls of which define dihedral angles, the apices of said dihedral angles of adjacent corrugations extend toward but normally out of contact with one another and being on planes parallel to the outer surfaces of said board and being adapted when the board is compressed to contact, the core then forming a girder structure, the walls of the corrugations acting as rigid struts to prevent further compression of said board, the corrugations being in the form of reversely arranged dove tails having their end faces parallel to the surface planes of the board, the cells formed by the corrugations being filled with insulation fiber, said board adapted to completely fill a wall space and provide equal density.

4. Thermal insulation board including a skeletal core member folded so as to produce transversely extending corrugations, the walls of which define dihedral angles, the apices of said dihedral angles of adjacent corrugations extend toward but normally out of contact with one another and being on planes parallel to the outer surfaces of said board and being adapted when the board is compressed to contact, the core then forming a girder structure, the walls of the corrugations acting as rigid struts to prevent further compression of said board, the corrugations being in the form of reversely arranged dove tails having their end faces parallel to the surface planes of the board, alternate dovetails being shorter than the intervening dovetails on the same side, the surface sheets secured to the end faces of the dovetails.

5. Thermal insulation board comprising a corrugated skeletal core having expansible and contractible sections, said sections being so constructed that when pressed in a thickness direction, they expand laterally bringing adjacent lateral parts into abutment thereby terminating further lateral as well as thickness-wise deformation.

6. Thermal insulation board including a skeletal core member folded so as to produce transversely extending corrugations, the walls of which define dihedral angles, the apices of said dihedral angles of adjacent corrugations extending toward but normally out of contact with one another, and being in planes parallel to the outer surfaces of said board, and being adapted when the board is compressed thickness-wise, to make contact, the core then forming a girder structure in which the walls of the corrugations act as rigid struts to prevent further compression of the said board, the corrugations being in the form of reversely arranged dovetails with their end faces parallel to the surface planes of the board, alternate dovetails being shorter than the intervening dovetails on the said side.

7. Thermal insulation board including a skeletal core member folded so as to produce transversely extending corrugations, the walls of which define dihedral angles, the apices of said dihedral angles of adjacent corrugations extending toward but normally out of contact with one another, and being in planes parallel to the outer surfaces of said board, and being adapted when the board is compressed thickness-wise, to make contact, the core then forming a girder structure in which the walls of the corrugations act as rigid struts to prevent further compression of the said board, the corrugations being in the form of reversely arranged dovetails with their end faces parallel to the surface planes of the board, alternate dovetails being shorter than the intervening dovetails on the same side, and surface sheets secured to the end faces of the taller dovetails.

8. Thermal insulation board including a skeletal core member folded so as to produce transversely extending corrugations, the walls of which define dihedral angles, the apices of said dihedral angles of adjacent corrugations extending toward but normally out of contact with one another, and being in planes parallel to the outer surfaces of said board, and being adapted when the board is compressed thickness-wise, to make contact, the core then forming a girder structure in which the walls of the corrugations act as rigid struts to prevent further compression of the said board, the corrugations being in the form of reversely arranged dovetails with their end faces parallel to the surface planes of the board, alternate dovetails being shorter than the intervening dovetails on the same side, and surface sheets secured to the end faces of the taller dovetails, the cells defined between said dovetails and said surface sheets being filled with fibrous insulation.

RALPH V. GRAYSON.
EDGAR G. BALLENGER.